US012792247B1

(12) United States Patent
Chen et al.

(10) Patent No.: US 12,792,247 B1
(45) Date of Patent: Nov. 10, 2026

(54) MEMORY INSTANCE CIRCUITRY AND METHODS

(71) Applicant: Arm Limited, Cambridge (GB)

(72) Inventors: Andy Wangkun Chen, Austin, TX (US); Yew Keong Chong, Austin, TX (US); Vivek Tiruvallur Echambadi, Austin, TX (US); Abhishek Kumar Singh, Baromuri (IN); Frederick Ion Reed, III, Chapel Hill, NC (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 19/252,023

(22) Filed: Jun. 27, 2025

(51) Int. Cl.
*G06F 3/06* (2006.01)

(52) U.S. Cl.
CPC ............ *G06F 3/064* (2013.01); *G06F 3/0625* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094;
(Continued)

(56) References Cited

U.S. PATENT DOCUMENTS 5,007,023 A * 4/1991 Kim ......................... G11C 8/18 365/230.03
5,034,900 A * 7/1991 Kimura .............. G06F 9/30018 712/E9.019

(Continued)

*Primary Examiner* — Daniel C. Chappell
(74) *Attorney, Agent, or Firm* — Pramudji Law Group PLLC; Ari Pramudji

(57) ABSTRACT

A circuit includes a first memory block and at least two second memory blocks. The first memory block has a first bit-width and includes first and second segments configured for independent activation. The at least two second memory blocks are arranged on opposing sides of the first memory block, and each have respective bit-widths. Also, each of the at least two second memory blocks is configured without independent activation; and the first memory block and the at least two second memory blocks are combined to form a logical memory instance having a second bit-width.

20 Claims, 4 Drawing Sheets

(58) Field of Classification Search
CPC ....... H04L 61/00–59; H04L 67/00–75; H10W 90/00–811; H10W 95/00; H10W 99/00
See application file for complete search history.

(56) References Cited

U.S. PATENT DOCUMENTS

| | | | | | |
|---|---|---|---|---|---|
| 5,204,841 | A * | 4/1993 | Chappell | G11C 8/12 | 365/189.12 |
| 5,396,450 | A * | 3/1995 | Takashima | G11C 11/4097 | 365/208 |
| 5,542,067 | A * | 7/1996 | Chappell | G11C 7/1072 | 365/233.17 |
| 9,891,976 | B2 * | 2/2018 | Chen | G06F 11/1012 | |
| 9,997,217 | B1 * | 6/2018 | Goel | G11C 11/4087 | |
| 10,222,418 | B2 * | 3/2019 | Chong | G01R 31/318541 | |
| 10,460,822 | B2 * | 10/2019 | Sisodia | G11C 29/32 | |
| 10,489,315 | B2 * | 11/2019 | Ringe | G06F 13/4018 | |
| 10,521,532 | B1 * | 12/2019 | Satasia | G06F 17/40 | |
| 10,607,659 | B2 * | 3/2020 | Bhargava | G11C 14/009 | |
| 10,861,575 | B2 * | 12/2020 | Sisodia | G11C 29/32 | |

* cited by examiner

MEMORY INSTANCE CIRCUITRY AND METHODS

FIELD

This disclosure pertains to systems, methods, and devices involving memory instance circuits.

DESCRIPTION OF RELATED ART

This section is intended to provide information relevant to understanding various technologies described herein. As the section's heading implies, this is a discussion of related art that in no way implies that the discussion is prior art. Generally, related art may or may not be considered prior art. Any statement in this section should be read in this light, and not as admission of prior art.

In modern infrastructure CPUs, increasing performance demands have led to significantly larger Level-2 (L2) cache tag memories. Specifically, as CPUs scale to multi-megabyte cache architectures, L2 tag memories have grown correspondingly larger, for instance, exceeding logical sizes of 1024 bits×190 bits. Conventional memories encounter substantial challenges due to increased wordline loading, causing significant timing degradation; or alternatively, considerable area penalties from increased memory splitting.

As an example, implementing a 1024×190 logical memory using existing solutions involves splitting into either two memory instances (e.g., 1024×95 each), which leads to prohibitive latency due to wordline load, or four memory instances (e.g., 1024×48 each), which meet timing but incur excessive silicon area usage. Hence, designers face a critical trade-off: sacrificing either performance (timing) or silicon efficiency (area). Accordingly, there exists a pressing need for memory architectures that effectively balance area and timing constraints for large L2 tag implementations in infrastructure CPU designs.

BRIEF DESCRIPTION OF THE DRAWINGS

Implementations of various techniques are described herein with reference to the accompanying drawings. The accompanying drawings illustrate various implementations described herein and are not meant to limit implementations of various techniques described herein.

Figure 1:
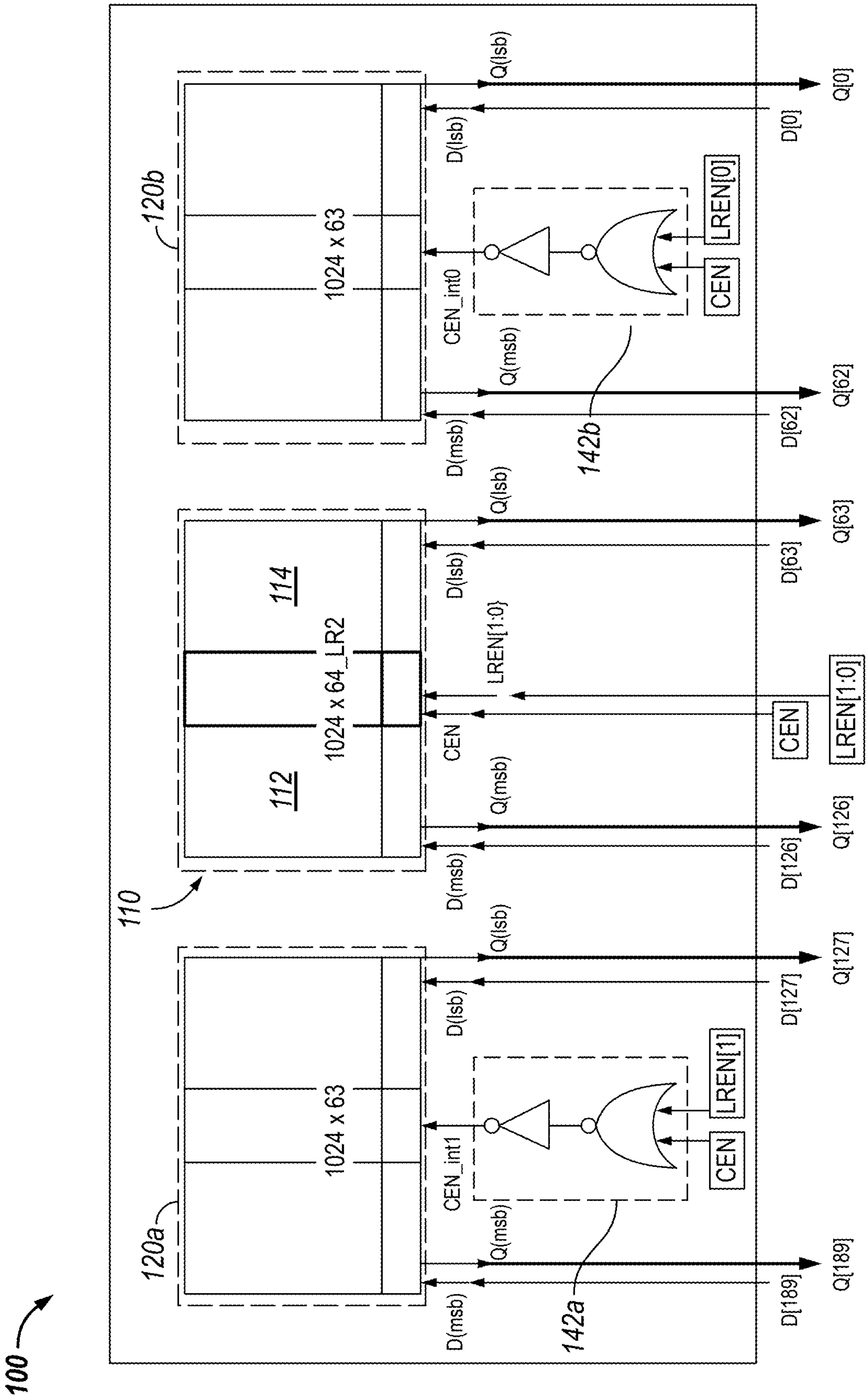
FIG. 1 is a diagram, in accordance with certain implementations.

Reference is made in the following detailed description to accompanying drawings, that form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other implementations may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, and the like), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

According to one implementation of the present disclosure, a circuit includes a first memory block and at least two second memory blocks. The first memory block has a first bit-width and includes first and second segments configured for independent activation. The at least two second memory blocks are arranged on opposing sides of the first memory block, and each have respective bit-widths. Also, each of the at least two second memory blocks is configured without independent activation; and the first memory block and the at least two second memory blocks are combined to form a logical memory instance having a second bit-width.

According to another implementation of the present disclosure, a method includes: 1) providing a first memory block having first and second segments configured for independent activation; 2) providing at least two second memory blocks arranged on opposing sides of the first memory block, wherein the at least two second memory blocks are configured without independent activation; and 3) forming a logical memory instance based on a combination of the first memory block and the at least two second memory blocks.

According to another implementation of the present disclosure, a memory system includes one or more first memory blocks, two or more second memory blocks, and control circuitry. Each of the one or more first memory blocks include most significant bit (MSB) and least significant bit (LSB) segments configured for independent activation. The two or more of second memory blocks are arranged adjacent to respective portions of the one or more of first memory blocks to form one or more respective logical memory instances. In addition, the control circuitry is configured to selectively activate or deactivate the MSB and LSB segments of each first memory block. Also, the control circuitry includes combinational logic configured to generate internal enable signals that independently control activation states of the MSB and LSB segments based on external chip enable and segment activation signals.

Inventive aspects propose novel memory architectures employing hybrid combinations of LR2-enabled memory and non-LR2 memory blocks (e.g., first and second memory blocks) in a split configuration. Specifically, in one example implementation, the invention combines two non-LR2 memory instances, each having a certain bit-width (e.g., 1024×63 bits), with a single LR2-enabled memory instance having a distinct bit-width (e.g., 1024×64 bits). The LR2-enabled memory includes specialized control inputs (e.g., LREN signals) capable of independently activating or deactivating most significant bit (MSB) and least significant bit (LSB) segments.

Functionally, the LR2-enabled memory dynamically enables selective memory access to either its MSB or LSB portions via the dedicated control signals. This allows the overall logical memory to be flexibly divided and efficiently accessed in halves (e.g., two segments of 95 bits each), significantly reducing silicon area usage by approximately 6%, in certain aspects, compared to traditional implementations, while incurring only minimal performance trade-offs (e.g., approximately 8% increase in access time (Tacc) and 2% cycle time penalty (Tcyc)).

Advantageously, the inventive architectures are also highly scalable, readily adaptable to even larger logical memory sizes (e.g., 1024×360 bits), employing a similar strategic combination of LR2 and non-LR2 memories, thereby consistently providing improved silicon efficiency and minimal timing impacts. Additionally, such architectures allows flexibility in memory segmentation, including symmetrical or asymmetrical arrangements of memory blocks; thus, further optimizing performance and power characteristics based on specific system requirements and floorplan considerations.

Certain definitions have been provided herein for reference. An LR2-enabled memory block (e.g., a first memory block), as described herein, refers to a memory block configured with two separately accessible and independently activatable segments (e.g., first and second segments). Such LR2-enabled memory blocks typically include dedicated control inputs (e.g., such as left-right enable (LREN) signals) configured to independently activate or deactivate each of these segments.

The first and second segments of the LR2-enabled memory block represent portions defined by subdividing the total bit-width of the LR2-enabled memory block. In certain implementations, the first segment corresponds specifically to a most significant bit (MSB) segment, while the second segment corresponds to a least significant bit (LSB) segment. Typically, each segment includes substantially half of the total bit-width of the LR2-enabled memory block, although other segment sizes or distributions are also possible.

Independent activation, as used herein, refers to the capability of separately controlling the activation or deactivation of individual segments within a memory block. In particular, independently activatable segments can be selectively activated or deactivated without affecting the activation state of other segments within the same memory block. Independent activation typically involves dedicated control signals or logic inputs (e.g., left-right enable signals (LREN [1:0])) to individually enable or disable specific segments (e.g., MSB or LSB segments), allowing each segment to operate or enter a standby mode independently.

A non-LR2 memory block (e.g., second memory block) describes a memory block that is not configured with independently activatable segments. These non-LR2 memory blocks can be arranged adjacent to or opposite an LR2-enabled memory block to form part of a logical memory instance. Non-LR2 memory blocks can have uniform or non-uniform bit-width configurations and can be arranged symmetrically or asymmetrically relative to the LR2-enabled memory block. For instance, portions of the non-LR2 memory blocks refer to discrete subdivisions or groups of bits within non-LR2 memory blocks. These portions combine with corresponding segments of an LR2-enabled memory block to form logical memory instances having predetermined total bit-widths.

A logical memory instance, as used herein, refers to a memory structure formed by combining at least one LR2-enabled memory block with at least two non-LR2 memory blocks. Such a logical memory instance is characterized by a predetermined bit-width greater than the bit-width of any individual memory block used in the combination. Logical memory instances advantageously enable selective activation of segments, thereby optimizing performance, power consumption, and silicon area efficiency.

The term bit-width refers to the number of data bits accommodated, accessed, or transferred simultaneously by a memory block or segment thereof. In various implementations, bit-width specifically refers to the total number of accessible bits across segments or portions forming a logical memory instance. The term data interface points refers to locations or interfaces within an integrated circuit (IC) at which memory blocks or logical memory instances connect or interface with logic circuitry, controllers, or external data paths. Memory blocks strategically placed proximate to these data interface points optimize memory access speeds by reducing signal routing distances and corresponding delays.

Combinational logic, as described herein, refers to circuitry configured to generate internal enable signals based on input signals such as external chip enable signals or segment activation signals. Such combinational logic typically includes logic gates, for example, NOR gates and inverters, arranged to selectively control activation states of memory segments, thereby enabling dynamic management of memory performance and power efficiency.

A symmetric configuration, as described herein, refers to an arrangement in which non-LR2 memory blocks are distributed evenly or symmetrically on opposing sides of an LR2-enabled memory block, having equal bit-widths on each side. An asymmetric configuration refers to an arrangement of non-LR2 memory blocks where the number, sizes, or bit-widths of blocks arranged on opposing sides of an LR2-enabled memory block differ. Such asymmetric arrangements provide flexibility for optimizing timing performance and accommodating variations in latency or criticality requirements across memory segments.

Referring to FIG. 1, a memory architecture 100 is shown according to example implementations. As illustrated, the memory architecture 100 is configured for efficiently implementing a logical memory instance, specifically for example, an L2 Tag memory of logical size 1024×190 bits. The memory architecture 100 includes a hybrid arrangement combining an LR2-based memory block 110 (e.g., a first memory block) and non-LR2-based memory blocks 120*a*, 120*b* (e.g., second memory blocks) in an odd-numbered split configuration. This hybrid approach addresses challenges related to increasing memory sizes in infrastructure CPUs, such as higher wordline RC delays and corresponding area and timing constraints.

In one example implementation, the logical memory instance of 1024×190 bits is built using two copies of non-LR2 memory blocks 120*a*, 120*b*, each having a bit-width of approximately 63 bits, and one LR2-enabled memory block 110 having a bit-width of approximately 64 bits. The LR2-based memory block 110, positioned centrally, is divided into two independently activatable segments (e.g., most significant bit (MSB) segment 112 and least significant bit (LSB) segment 114), each selectively controlled through dedicated enable signals. For instance, in such an example, each 95-bit half of the logical memory instance is formed by combining one of the 63-bit non-LR2 memory blocks (120*a* or 120*b*) with a respective 32-bit portion (e.g., either MSB segment 112 or LSB segment 114) of the LR2-enabled memory block 110. Specifically, the left-side (e.g., as shown but can be any side direction) 95 bits include the 63-bit non-LR2 block 120*a* combined with the MSB segment 112 of the LR2-enabled block 110, while the right-side (e.g., as shown but can be any opposing side direction) 95 bits include the 63-bit non-LR2 block 120*b* combined with the LSB segment 114 of the LR2-enabled block 110. Using this combination of memory blocks (e.g., 110, 120*a*, and 120*b*), the architecture achieves approximately a 6% area reduction compared to previous implementations, while minimally impacting access time (e.g., approximately 8% Tacc penalty) and cycle time (e.g., approximately 2% Tcyc penalty).

In certain aspects, top-level control signals for the memory architecture 100 include a chip Enable signal (CEN) and LR2 enable signals (LREN[1:0]). Specifically, when CEN is set to "0", the memory is enabled for read/write operations. Conversely, setting CEN to "1" places the memory into standby mode, thereby reducing power consumption. The LR2 enable signals (LREN[1:0]) provide selective enablement for the segments (e.g., 112, 114) of the LR2-based memory block 110. In particular, in one example, LREN[1] set to "0" activates the MSB segment 112, and LREN[0] set to "0" activates the LSB segment 114. In one example, when both LREN[1:0] signals are set to "1", both segments (112, 114) are deactivated.

Further, in various cases, combinational logic 142*a*, 142*b* (e.g., respective NOR gate plus inverter combinations in one implementation) is provided for generating internal enable signals (e.g., CEN_int1 and CEN_int0) by merging the top-level CEN signal and the corresponding LR2 enable signals (e.g., LREN[1] for MSB segment 112 and LREN[0] for LSB segment 114). By doing so, the appropriate segments of memory blocks can be selectively activated. In such cases, the relationship between these control signals and internal enable signals is detailed in the truth tables provided below.

Truth table to enable MSB side of 95 bit

| CEN | LREN[1] | CEN_int1 |
|---|---|---|
| 1 | X | 1 |
| 1 | X | 1 |
| 0 | 0 | 0 |
| 0 | 1 | 1 |
| 0 | 0 | 0 |
| 0 | 1 | 1 |

Truth table to enable LSB side of 95 bit

| CEN | LREN[0] | CEN_int0 |
|---|---|---|
| 1 | X | 1 |
| 1 | X | 1 |
| 0 | 0 | 0 |
| 0 | 1 | 1 |
| 0 | 0 | 0 |
| 0 | 1 | 1 |

Additionally, in certain implementations, each memory block (e.g., 110, 120*a*, 120*b*) includes standard input and output pins. Data inputs (e.g., D[189:0]) and outputs (e.g., Q[189:0]) are provided according to their respective bit positions. In various cases, a global write enable (GWEN) signal controls the overall read and write functionalities of both LR2-based and non-LR2 blocks, while address inputs (e.g., A[n:0] not shown in FIG. 1) specify locations within memory blocks for performing read and write operations.

Advantageously, the memory architecture 100 provides a flexible, dynamically accessible solution to implement large logical memory sizes, effectively balancing area, timing, and power efficiency through selective and controlled activation of memory segments.

Figure 2:
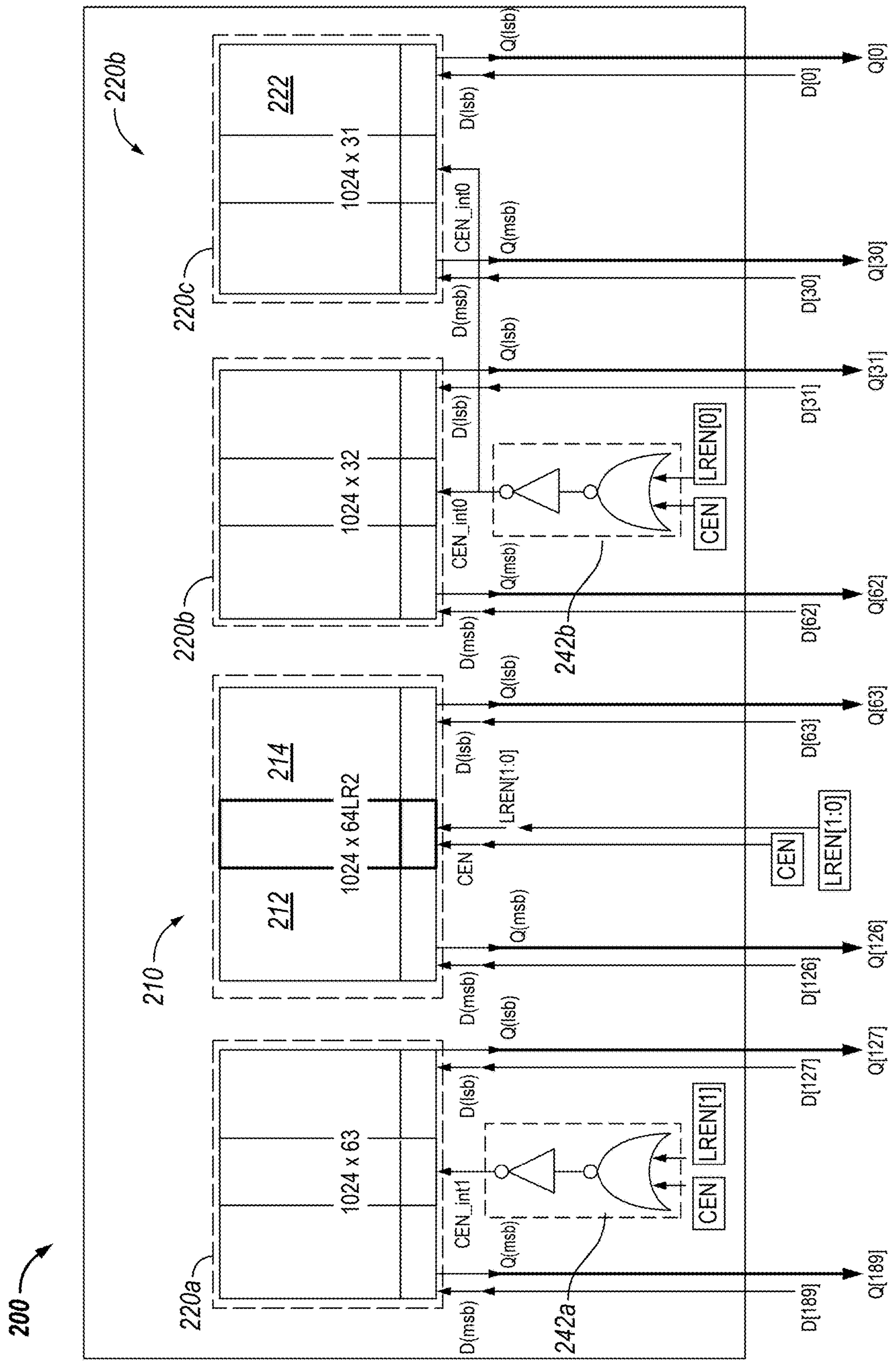
FIG. 2 is a diagram, in accordance with certain implementations.

Referring to FIG. 2, a memory architecture 200 is shown according to example implementations. As illustrated, the memory architecture 200 is configured to efficiently implement a logical memory instance, specifically, for example, an L2 Tag memory of logical size 1024×190 bits. Similar to the previous example described with reference to FIG. 1, the memory architecture 200 includes a hybrid memory arrangement combining an LR2-based memory block 210 (e.g., a first memory block) and multiple non-LR2-based memory blocks 220*a*, 220*b*, and 220*c* (e.g., second memory blocks) positioned on opposing sides of the LR2-based memory block 210. In contrast to FIG. 1, the FIG. 2 architecture employs an asymmetric configuration of the second memory blocks.

In one example implementation, the logical memory instance of 1024×190 bits is built using a first memory block 210 having a bit-width of approximately 64 bits and comprising two independently activatable segments (e.g., most significant bit (MSB) segment 212 and least significant bit (LSB) segment 214). The memory architecture 200 further includes second memory blocks arranged asymmetrically on opposing sides of the first memory block 210. For instance, in the illustrated example, the left side includes a single second memory block 220*a* having a bit-width of approximately 63 bits, while the right side employs two separate second memory blocks 220*b* and 220*c*, having respective bit-widths of approximately 32 bits and 31 bits. Collectively, each side totals 95 bits, satisfying the required logical segment size of the overall logical memory instance (e.g., 190 bits).

As may be appreciated, while FIG. 2 specifically illustrates an implementation with one second memory block (e.g., 220*a*) on one side and two second memory blocks (e.g., 220*b*, 220*c*) on the other side, inventive aspects are not limited to this particular configuration or bit-width distribution. Rather, any suitable number and combination of bit-widths and memory blocks may be utilized, provided the aggregate total bit-width per side equals the desired logical segment size. Furthermore, although the depicted memory blocks are arranged asymmetrically, alternative configurations employing different quantities, bit-widths, and arrangements of second memory blocks remain fully within the scope of the invention.

Advantageously, the asymmetric memory block arrangement provides additional flexibility and opportunities for optimization. For example, designers can strategically position smaller second memory blocks (e.g., 220*b*, 220*c*) to handle memory segments with critical timing requirements. Smaller-sized memory blocks inherently offer reduced loading and decreased routing complexity, resulting in faster access times. Thus, critical bits demanding faster access may be strategically placed in smaller memory blocks (e.g., 220*b*, 220*c*) to enhance timing performance significantly. Accordingly, this asymmetric arrangement allows for improved speed and optimized performance for memory segments with higher timing criticality, while simultaneously maintaining overall area efficiency and minimizing power consumption and cycle time penalties.

In certain aspects, operational controls for memory architecture 200 remain consistent with those described previously in FIG. 1. For example, top-level control signals continue to include a chip enable signal (CEN) and LR2 enable signals (LREN[1:0]). Specifically, when CEN is set to "0", the memory architecture 200 is enabled for read/write operations. Conversely, setting CEN to "1" places the memory architecture into standby mode to reduce power consumption. The LR2 enable signals (LREN[1:0]) provide selective and independent enablement for segments (e.g., 212, 214) of the LR2-based memory block 210 (e.g., the first memory block). Particularly, in one example, setting LREN [1] to "0" independently activates the MSB segment 212, and setting LREN[0] to "0" independently activates the LSB segment 214. In one example, setting both LREN[1:0] signals to "1" deactivates both segments (e.g., 212, 214).

Further, in various cases, combinational logic 242*a*, 242*b* (e.g., such as NOR gate plus inverter combinations in one implementation) selectively generates internal enable signals (CEN_int1, CEN_int0) by merging the top-level CEN signal with corresponding LR2 enable signals (LREN[1] for MSB segment 212 and LREN[0] for LSB segment 214). Accordingly, respective segments of memory blocks are selectively activated based on the relationships detailed previously in the truth tables provided with reference to FIG. 1.

Additionally, in certain implementations, each memory block (e.g., 210, 220*a*, 220*b*, 220*c*) includes standard input and output pins. Data inputs (D[189:0]) and outputs (Q[189:0]) correspond to their respective bit positions. In various cases, a global write enable (GWEN) signal controls the overall read and write functionalities across both LR2-based and non-LR2 memory blocks, while address inputs (A[n:0]) (not shown) specify locations within the memory blocks for performing read and write operations.

Advantageously, the memory architecture 200 provides designers additional flexibility to manage performance, power, and silicon area constraints effectively. Further, the described asymmetric arrangement and associated selective activation capability enable improved optimization of critical memory segments, providing a dynamically accessible solution that effectively balances silicon area efficiency, timing performance, and power consumption.

Further, in various implementations, the asymmetric memory arrangement shown in FIG. 2 may be readily extended to support larger logical memory sizes (e.g., greater than 1024×190 bits), as described in greater detail with reference to FIG. 3 below.

Figure 3:
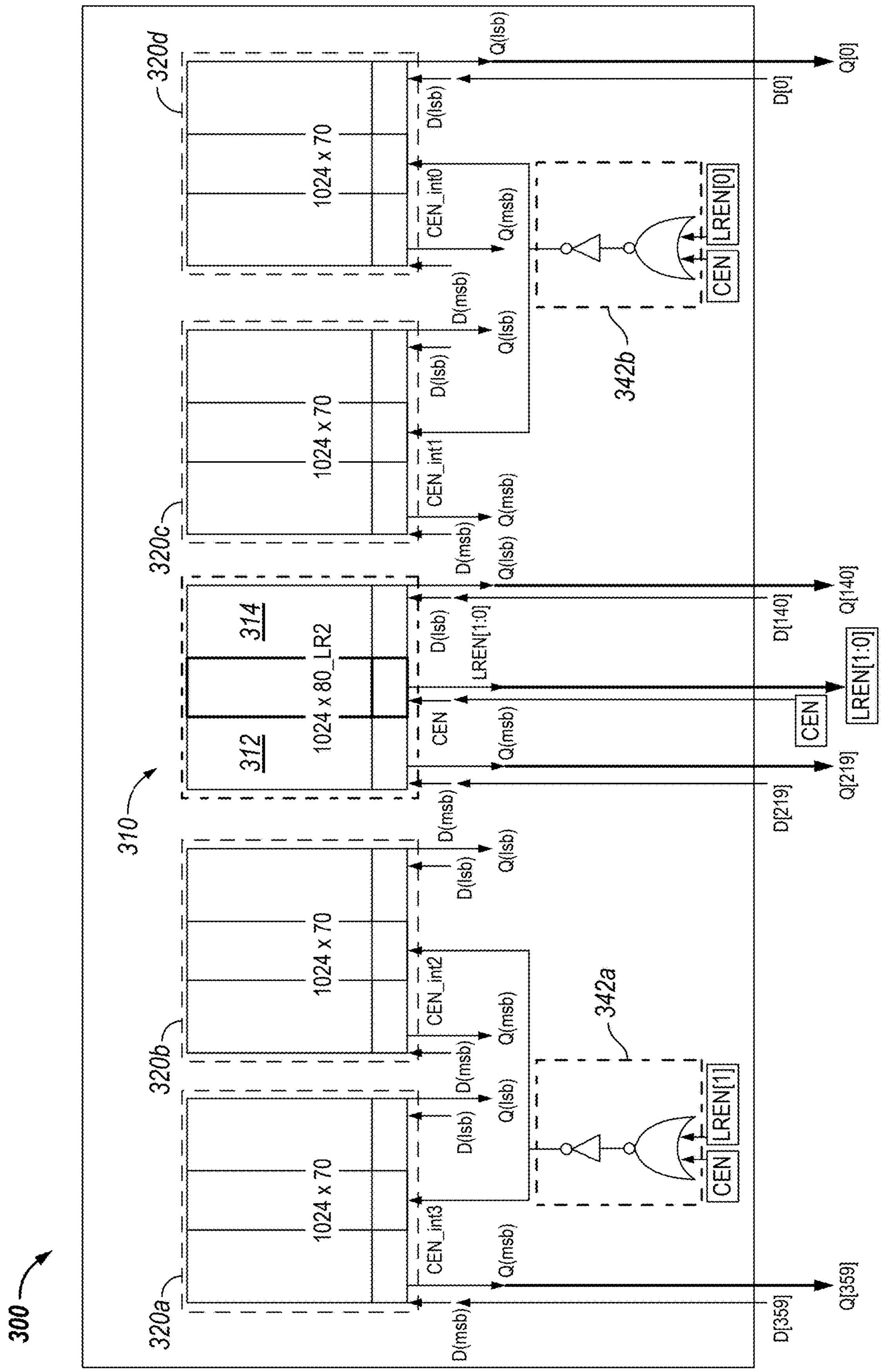
FIG. 3 is a diagram, in accordance with certain implementations.

Referring to FIG. 3, a memory architecture 300 is shown according to example implementations. As illustrated, the memory architecture 300 demonstrates scalability to efficiently implement a larger logical memory instance, specifically, for example, an L2 Tag memory of logical size 1024×360 bits. Somewhat similar to the hybrid approaches described previously with reference to FIGS. 1 and 2, the implementation employs an odd-numbered split configuration combining an LR2-based memory block 310 (e.g., a first memory block) positioned centrally, with multiple non-LR2-based memory blocks 320*a*, 320*b*, 320*c*, and 320*d* (e.g., second memory blocks) distributed symmetrically on opposing sides.

In one example scenario, as depicted in FIG. 3, the logical memory instance of 1024×360 bits is realized using four second memory blocks 320*a*-320*d*, each sized at approximately 70 bits, and a single centrally positioned first memory block 310 sized at approximately 80 bits. The first memory block 310 is configured with two independently activatable segments (e.g., most significant bit (MSB) segment 312 and least significant bit (LSB) segment 314), each selectively controlled via dedicated enable signals (LREN [1:0]). For instance, in the illustrated example, each side (e.g., left and right, though orientation is illustrative and not limiting) aggregates to approximately 180 bits, where the left side includes two 70-bit second memory blocks (320*a*, 320*b*) combined with a 40-bit MSB segment 312 of the first memory block 310, and similarly, the right side includes two additional 70-bit second memory blocks (320*c*, 320*d*) combined with a 40-bit LSB segment 314 of the first memory block 310. Advantageously, employing such a hybrid memory arrangement provides enhanced area efficiency compared to conventional approaches, with minimal performance characteristics such as access time (Tacc) and cycle time (Tcyc).

In certain aspects, the memory architecture 300 is highly scalable. For instance, by utilizing centrally positioned LR2-enabled memory blocks such as the first memory block 310, designers can strategically divide and scale memory segments flexibly, enabling support for even larger logical memory sizes beyond the illustrated 1024×360-bit example.

In various cases, although FIG. 3 specifically depicts four identical 70-bit second memory blocks (320*a*-320*d*) symmetrically positioned, inventive aspects are not limited to this exact number or configuration. Rather, any suitable number and combination of second memory blocks and centrally positioned first memory blocks (with independently activatable segments) may be used, provided the aggregate bit-width matches the targeted logical memory instance size.

Operational controls for memory architecture 300 remain consistent with those described previously with reference to FIGS. 1 and 2. For example, top-level operational controls include a chip enable signal (CEN) and LR2 enable signals (LREN[1:0]). Specifically, when CEN is set to "0", the memory architecture 300 is enabled for read/write operations. Conversely, setting CEN to "1" places the memory architecture into standby mode, thereby reducing power consumption. In particular, for example, LR2 enable signals (LREN[1:0]) independently activate the segments (312, 314) of the centrally positioned first memory block 310. Specifically, setting LREN[1] to "O" independently activates the MSB segment 312, and setting LREN[0] to "0" independently activates the LSB segment 314. In one example, when both LREN[1:0] signals are set to "1", both segments (312, 314) are deactivated.

Further, in certain aspects, combinational logic 342*a*, 342*b* (e.g., such as NOR gate plus inverter combinations) selectively generates internal enable signals (e.g., CEN_int0, CEN_int1, CEN_int2, CEN_int3) by merging the top-level CEN signal with corresponding LR2 enable signals (LREN[1] for MSB segment 312, and LREN[0] for LSB segment 314). Accordingly, respective segments of memory blocks are selectively activated according to relationships detailed previously in the truth tables provided with reference to FIG. 1.

Additionally, in certain implementations, each memory block (e.g., 310, 320*a*-320*d*) includes standard input and output pins. Data inputs (D[359:0]) and outputs (Q[359:0]) correspond to their respective bit positions. In various cases, a global write enable (GWEN) signal controls overall read and write functionalities across both LR2-based and non-LR2 memory blocks, while address inputs (A[n:0]) (not shown) specify locations within memory blocks for performing read and write operations.

Advantageously, as highlighted previously, the scalable hybrid memory architecture 300 efficiently accommodates larger memory sizes, providing designers greater flexibility to strategically optimize timing performance, silicon area efficiency, and power consumption. This flexibility is particularly beneficial in modern computing architectures, where increasingly larger logical memory instances are required while maintaining stringent performance, power, and area constraints. Further, in certain cases, the hybrid memory architecture described with reference to FIG. 3 can be extended and customized further, illustrating the versatility of inventive aspects in supporting diverse logical memory sizes and configurations beyond those explicitly depicted.

In certain aspects, additional flexibility may be achieved by strategically positioning memory blocks within the physical layout of an integrated circuit (IC). For instance, memory segments handling data with stringent timing requirements may be intentionally implemented using smaller-sized memory blocks and positioned physically closer to related logic circuits or data interface points within the IC. Such placement advantageously reduces signal routing distance, thereby enhancing access speed and overall timing performance. Conversely, memory segments associated with less timing-critical data can be implemented using larger or comparatively slower memory configurations, placed further from logic or interface points; thereby, optimizing available layout space without adversely affecting system performance.

Moreover, hybrid memory structures employing LR2-enabled and non-LR2 memory blocks, as described above (e.g., FIGS. 1-3), can further leverage such strategic physical placement. For example, selectively deploying higher-performance, lower-latency memory blocks in critical timing regions, while using higher-density or slower memory blocks in regions with relaxed timing requirements, allows designers to carefully manage trade-offs between silicon area, operational performance, and power efficiency. Such a combined approach enhances overall optimization so as to realize additional gains in area efficiency and improved performance.

Further, inventive aspects are not limited to strictly symmetric or asymmetric memory configurations described in the illustrative examples above. Variations in both the number and arrangement of memory blocks, including mixed bit-width configurations on opposing sides of centrally located LR2-enabled memory segments, are also contemplated. This inherent flexibility enables the disclosed memory architectures to be readily adapted to diverse practical applications and evolving performance requirements. In this manner, inventive memory architectures may be advantageously adapted to a wide range of logical memory sizes, extending beyond the illustrative examples described herein.

In various implementations, inventive aspects include memory systems including one or more centrally positioned LR2-enabled memory blocks (e.g., first memory blocks). Each first memory block includes independently activatable most significant bit (MSB) and least significant bit (LSB) segments. Multiple non-LR2 memory blocks (e.g., second memory blocks) are arranged adjacent to respective portions of the first memory blocks. In certain cases, these first and second memory blocks combine to form logical memory instances, each having predetermined bit-widths.

In some implementations, control circuitry is provided to selectively activate or deactivate the MSB and LSB segments independently. The control circuitry typically includes combinational logic (e.g., NOR gates and inverter circuits in certain cases) configured to generate internal enable signals (e.g., CEN_int0, CEN_int1). These internal enable signals are generated based on external chip enable signals (CEN) and segment activation signals (LREN[1:0]), as described previously in FIGS. 1-3. In various cases, the control circuitry itself is not shown but is electrically coupled to the combinational logic circuits. Alternatively, in other examples, the combinational logic circuits may themselves be considered part of the control circuitry block.

Advantageously, selective and independent activation of memory segments allows dynamic optimization of memory access, performance, and power consumption. As a result, the described memory systems provide enhanced flexibility, efficiency, and performance across diverse integrated circuit applications.

Figure 4:
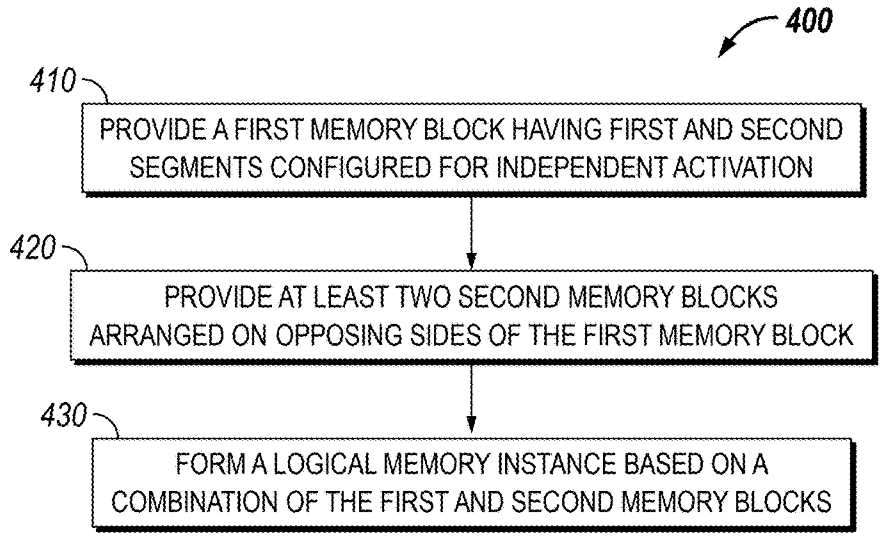
FIG. 4 is a flow chart, in accordance with certain implementations.

Referring to FIG. 4, a method 400 for configuring and selectively activating memory segments within a logical memory instance is illustrated according to example implementations. In certain aspects, the method 400 provides efficient memory segmentation, improved timing optimization, and enhanced silicon area utilization within a memory architecture by strategically combining and independently activating memory segments. In various implementations, the method 400 utilizes selectively activatable segments (e.g., most significant bit (MSB) and least significant bit (LSB) segments as illustrated previously in FIGS. 1-3), arranged in combination with second memory blocks positioned adjacent to a centrally located first memory block, thereby dynamically managing memory access, power efficiency, and performance within the memory architecture.

At block 410, the method 400 includes providing a first memory block having first and second segments configured for independent activation. In some implementations, the first memory block corresponds to an LR2-based memory block (e.g., memory blocks 110, 210, 310 described previously in FIGS. 1-3), where each segment is independently activatable via dedicated control signals (e.g., LREN[1:0]). In certain cases, the first and second segments specifically correspond to an MSB segment (e.g., segments 112, 212, 312) and an LSB segment (e.g., segments 114, 214, 314), respectively.

At block 420, the method 400 further includes providing at least two second memory blocks arranged on opposing sides of the first memory block. In various implementations, the second memory blocks (e.g., memory blocks 120*a*, 120*b*, 220*a*-220*c*, 320*a*-320*d*) are configured without independent activation capability, each having respective bit-widths that collectively form portions of the logical memory instance. In some examples, the second memory blocks are configured as unified memory segments activated collectively as single units.

At block 430, the method 400 includes forming a logical memory instance based on a combination of the first memory block and the at least two second memory blocks. In certain implementations, this combination step strategically arranges second memory blocks about the centrally positioned first memory block. For instance, in one example, a symmetric arrangement positions equal bit-width second memory blocks on opposing sides of the first memory block (as described previously with respect to FIGS. 1 and 3). In alternative implementations, as depicted in FIG. 2 for example, the second memory blocks are arranged asymmetrically to further optimize timing performance and silicon area efficiency.

In certain aspects, the method further includes selectively activating, via dedicated control signals, either the first or second segment of the first memory block independently. In certain implementations, selective activation includes independently controlling activation states of the MSB and LSB segments (e.g., segments 112/114, 212/214, 312/314), enabling dynamic optimization of memory access and performance. Advantageously, selectively activating these segments provides granular control over power consumption, allowing inactive segments to be placed into standby mode. Advantageously, doing so, significantly reduces overall power usage.

In some cases, the method specifically includes asymmetrically arranging the second memory blocks about the first memory block. As described previously with respect to FIG. 2, asymmetrically arranging the second memory blocks (e.g., employing different quantities or bit-widths of blocks) advantageously enables designers to optimize timing characteristics and performance for memory segments with critical timing demands.

In various cases, the method further includes strategically placing smaller second memory blocks (e.g., second memory blocks 220*b*, 220*c*) proximate to logic or data interface points within an integrated circuit. In certain implementations, placing smaller memory blocks closer to logic or data interface points advantageously reduces routing distances and corresponding delays, thereby improving memory access speeds and performance characteristics.

In certain implementations, the selective activation of memory segments within the logical memory instance is controlled using combinational logic (e.g., NOR gate and inverter combinations 142*a*-142*b*, 242*a*-242*b*, 342*a*-342*b* described previously in FIGS. 1-3). Advantageously, this combinational logic selectively generates internal enable signals (e.g., CEN_int0, CEN_int1) by combining external chip enable signals (CEN) with segment activation signals (LREN[1:0]), thereby precisely managing the independent activation of segments within the first memory block.

In further aspects, the method 400 dynamically manages activation states of the first memory block segments based on real-time performance or power constraints. For example, adaptive timing circuitry or control logic (not explicitly shown) dynamically adjusts activation durations or segment states in response to varying memory usage conditions, thereby enhancing overall efficiency and responsiveness to memory access patterns and workloads.

Additionally, the method 400 may include balancing memory utilization between segments of the first memory block and adjacent second memory blocks. Such balancing ensures consistent memory performance, minimizes bottlenecks, and stabilizes operational characteristics of the logical memory instance, thereby promoting robust long-term operation and optimized performance.

Accordingly, the method 400 depicted in FIG. 4 provides an adaptive approach to memory segment configuration and selective activation, employing strategic combinations of first and second memory blocks, selective segment activation, asymmetric memory arrangements, strategic placement of memory blocks near interface points, and dynamic memory segment management. Collectively, these techniques significantly enhance efficiency, performance, responsiveness, and power optimization capabilities of hybrid memory architectures implemented within modern integrated circuits.

Figure 5:
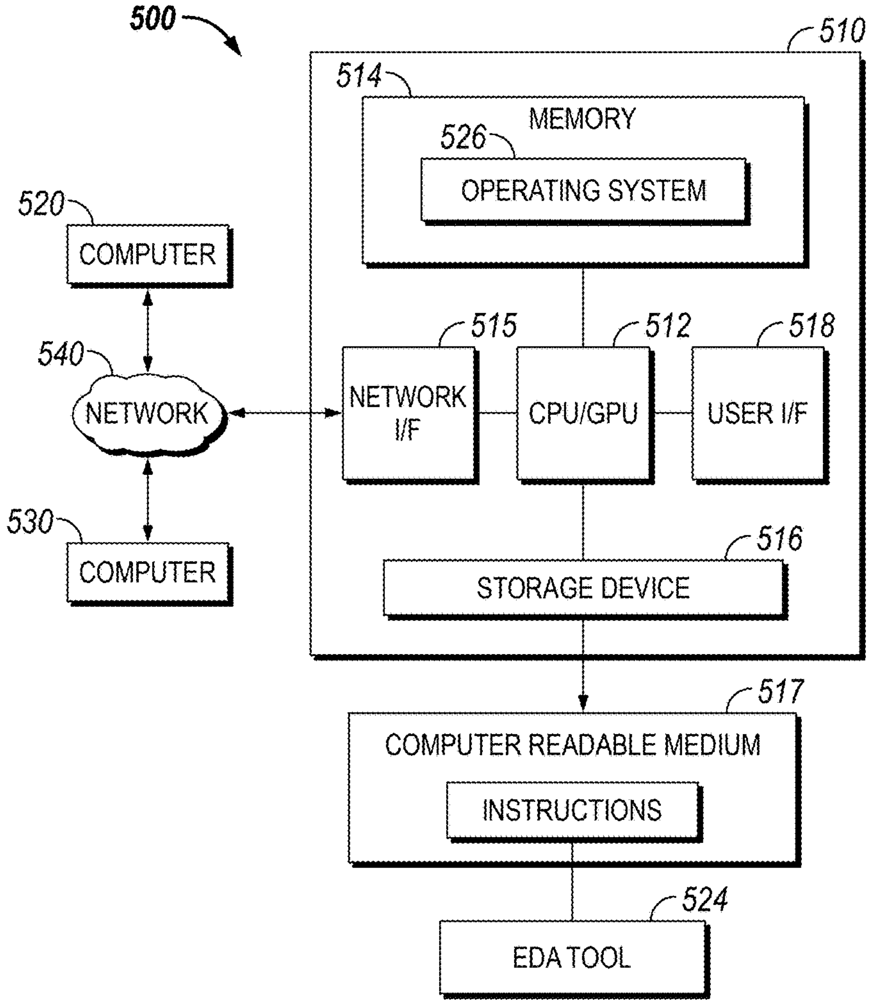
FIG. 5 is a diagram, in accordance with certain implementations.

Referring to FIG. 5, example hardware components in a computer system 500 are illustrated according to example implementations. In various aspects, the computer system 500 is configured to facilitate the design, simulation, verification, and optimization of the inventive hybrid memory architectures and selective segment activation methodologies described herein. In certain implementations, the computer system 500, representing a computing environment or server system, includes at least one electronic design automation (EDA) tool 524 configured to execute software processes described previously with reference to FIGS. 1 through 4. For instance, EDA tool 524 automates the design, simulation, analysis, verification, and optimization of hybrid memory architectures that include centrally positioned first memory blocks with independently activatable segments and second memory blocks arranged on opposing sides, as illustrated previously in FIGS. 1, 2, 3, and 4.

In various aspects, the EDA tool 524 may be integrated within existing electronic design software platforms, automating the synthesis, verification, and simulation of the described hybrid memory architectures. More specifically, the EDA tool 524 is configured to perform simulations and validations of memory block-level circuits, logical memory instances, and corresponding netlists. Such memory architectures specifically include centrally located first memory blocks (e.g., memory blocks 110, 210, 310) including independently activatable most significant bit (MSB) segments (e.g., 112, 212, 312) and least significant bit (LSB) segments (e.g., 114, 214, 314), and second memory blocks (e.g., memory blocks 120*a*-120*b*, 220*a*-220*c*, 320*a*-320*d*) positioned symmetrically or asymmetrically, as detailed previously in FIGS. 1-4. The EDA tool 524 accurately simulates operational controls and selective segment activation (e.g., via enable signals LREN[1:0] and combinational logic circuits 142*a*-142*b*, 242*a*-242*b*, 342*a*-342*b*), thereby validating memory performance, timing characteristics, area utilization, and power optimization.

In some implementations, the EDA tool 524 conducts detailed transient analyses, timing simulations, and power-efficiency evaluations to optimize memory block sizes, transistor-level implementations, combinational logic configurations, and placement of second memory blocks relative to first memory blocks. These analyses ensure optimized access times, minimized power consumption, improved routing complexity, and enhanced silicon area efficiency. The physical design processes executed by the EDA tool 524 optimize layout and routing strategies for memory blocks, selectively activatable segments, and associated combinational logic, ensuring efficient silicon utilization and minimizing interconnect-induced delays and power losses.

Additionally, the EDA tool 524 performs electrical simulations (e.g., steady-state and transient simulations) and dynamic load evaluations, verifying robust performance of the memory architectures under varied access conditions. Further, the EDA tool 524 performs formal verification procedures, functional equivalence checks, and generates test vectors, confirming correctness, manufacturability, robustness, and reliability of the memory implementations in actual silicon devices.

In certain implementations, procedures described herein, such as the memory configuration and selective activation method 400 (with reference to FIG. 4), may be stored as program instructions 517 on a computer-readable medium, for example within a storage device 516 or memory 514. These instructions 517 may be executed by one or more computing devices or servers 510, 520, 530. Each computing device 510, 520, 530 may include any suitable computer, workstation, server, or programmable electronic device. Additionally, computing devices 510, 520, 530 may operate individually or collaboratively in a distributed computing system interconnected via one or more networks 540.

Computer 510 generally includes a central processing unit (CPU) 512 (or alternatively, a graphics processing unit (GPU), neural processing unit (NPU), or other specialized processors) coupled to memory 514. Memory 514 may represent random access memory (RAM), cache memory, non-volatile memory (e.g., flash memory), read-only memory (ROM), or combinations thereof. Additional memory or storage may also be present within computer system 500, such as supplemental cache memory within CPU 512 or virtual memory stored within storage device 516 or other devices interconnected through network 540.

Computer 510 also includes a user interface (I/F 518) for interaction with circuit designers, verification engineers, or other users. Interface 518 typically comprises input devices such as keyboards, mice, touchpads, and microphones, and output devices such as display monitors or LCD/LED screens. Additionally, computer 510 comprises network interface (I/F 515) connected to network(s) 540, enabling communication and data exchange with remote computing devices or servers 520, 530. Computer 510 operates under control of an operating system 526 stored in memory 514 or storage device 516. Example operating systems include UNIX®, Linux®, Windows®, and others recognized by skilled artisans. Software tools such as EDA tool 524 and instructions 517 for implementing hybrid memory architectures and selective activation methods described herein may execute on CPU 512 or distributed processors across networked computing devices 520, 530.

Databases accessible to computer system 500 may include memory cell libraries, transistor-level netlists, standard cell definitions, combinational logic models, and standard design file formats (e.g., OASIS, GDSII, SPICE, EDIF) stored within memory 514, storage device 516, or distributed across computers 520, 530 connected via network 540. System 500 supports integrated circuit (IC) designs comprising standard cells, custom memory blocks, independently activatable memory segments, combinational logic circuits, and memory architectures utilizing hybrid LR2 and non-LR2 configurations. Leveraging these databases and resources, the EDA tool 524 generates optimized transistor-level netlists and physical layouts explicitly incorporating the described hybrid memory architectures, selective segment activation methodologies, asymmetric and symmetric memory arrangements, and strategic placement techniques. Consequently, the system 500 enables comprehensive optimization and verification, ensuring efficient memory utilization, optimized timing performance, minimized silicon area usage, improved power management, and robust operation in fabricated memory architectures.

Concepts described herein may be embodied in computer-readable code for fabrication of apparatus embodying the disclosed concepts. The computer-readable code can be used at one or more stages of a semiconductor design and fabrication process, including electronic design automation (EDA), to fabricate integrated circuits implementing the inventive memory architectures and associated activation methods. The computer-readable code may define hardware description language (HDL) representations (e.g., Verilog, SystemVerilog, Chisel, VHDL, FIRRTL, SystemC) or low-level descriptions (e.g., netlists, layouts, Graphics Database System II (GDSII)). Logic synthesis processes can also generate bitstreams loaded into field-programmable gate arrays (FPGAs) for pre-fabrication testing and verification.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, where such instructions may execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which includes one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms “first”, “second”, etc. are used herein merely as labels, and are not intended to impose ordinal, positional, or hierarchical requirements on the items to which these terms refer. Moreover, reference to, e.g., a “second” item does not require or preclude the existence of, e.g., a “first” or lower-numbered item, and/or, e.g., a “third” or higher-numbered item.

Reference herein to “one example” means that one or more feature, structure, or characteristic described in connection with the example is included in at least one implementation. The phrase “one example” in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A circuit comprising:

a first memory block having a first bit-width and comprising first and second segments configured for independent activation; and at least two second memory blocks arranged on opposing sides of the first memory block, the at least two second memory blocks each having respective bit-widths, wherein:

each of the at least two second memory blocks is configured without independent activation; and the first memory block and the at least two second memory blocks are combined to form a logical memory instance having a second bit-width.

2. The circuit of claim 1, wherein the first memory block comprises separate enable signals configured to independently activate or deactivate the first and second segments.

3. The circuit of claim 1, wherein:

the first and second segments are configured to be independently activated;

the first segment comprises a most significant bit (MSB) segment, and the second segment comprises a least significant bit (LSB) segment; and the first memory block comprises control inputs configured to selectively and independently activate or deactivate the first and second segments.

4. The circuit of claim 1, wherein each of the first and second segments of the first memory block comprises substantially half of the first bit-width.

5. The circuit of claim 1, wherein the at least two second memory blocks are arranged symmetrically with respect to the first memory block.

6. The circuit of claim 1, wherein the at least two second memory blocks comprise an asymmetric configuration with respect to the first memory block.

7. The circuit of claim 1, wherein the at least two second memory blocks arranged on opposing sides of the first memory block collectively have respective bit-widths substantially equal in value.

8. The circuit of claim 1, wherein the logical memory instance has a bit-width greater than a combined bit-width of the first and second segments of the first memory block.

9. The circuit of claim 1, wherein the logical memory instance has a bit-width equal to the combined bit-width of the first memory block and each of the at least two second memory blocks.

10. The circuit of claim 1, wherein the second memory blocks comprise bit storage segments configured without dedicated internal enable signals.

11. The circuit of claim 1, further comprising:
combinational logic configured to independently enable either the first segment or the second segment of the first memory block.

12. The circuit of claim 11, wherein:
the combinational logic provides selective activation of the first and second segments; and
the selective activation reduces power consumption by placing inactive segments into standby mode.

13. The circuit of claim 11, wherein the combinational logic is configured to generate internal enable signals responsive to external chip enable and segment activation signals.

14. The circuit of claim 1, wherein the first memory block has a larger bit-width than each of the at least two second memory blocks.

15. A method comprising:
providing a first memory block having first and second segments configured for independent activation;
providing at least two second memory blocks arranged on opposing sides of the first memory block, wherein the at least two second memory blocks are configured without independent activation; and
forming a logical memory instance based on a combination of the first memory block and the at least two second memory blocks.

16. The method of claim 15, further comprising:
combining each of the first and the second segments of the first memory block with respective portions of the at least two second memory blocks to form the logical memory instance; and
selectively activating, via control signals, either the first or the second segment of the first memory block independently.

17. The method of claim 16, wherein:
selectively activating comprises independently controlling activation of the first and second segments; and
the first segment comprises a most significant bit (MSB) segment and the second segment comprises a least significant bit (LSB) segment.

18. The method of claim 16, wherein combining each of the first and second segments comprises:
asymmetrically arranging the at least two second memory blocks with respect to the first memory block.

19. The method of claim 16, further comprising:
placing the at least two second memory blocks proximate to logic or data interface points within an integrated circuit.

20. A memory system comprising:
one or more first memory blocks, each comprising most significant bit (MSB) and least significant bit (LSB) segments configured for independent activation;
two or more second memory blocks arranged adjacent to respective portions of the one or more first memory blocks to form one or more respective logical memory instances; and
control circuitry configured to selectively activate or deactivate the MSB and LSB segments of each first memory block, wherein:
the control circuitry comprises combinational logic configured to generate internal enable signals that independently control activation states of the MSB and LSB segments based on external chip enable and segment activation signals.

* * * * *